United States Patent
Fardig et al.

(10) Patent No.: US 9,948,727 B2
(45) Date of Patent: Apr. 17, 2018

(54) SECURELY TRANSFERRING SESSION INFORMATION

(71) Applicant: LENOVO (Singapore) PTE, LTD., New Tech Park (SG)

(72) Inventors: Matthew William Fardig, Boonville, IN (US); Travis Lee Ennis, Jasper, IN (US); Roger Alan Thomas, GreenCastle, IN (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 494 days.

(21) Appl. No.: 14/615,147

(22) Filed: Feb. 5, 2015

(65) Prior Publication Data

US 2016/0234318 A1 Aug. 11, 2016

(51) Int. Cl.
*H04L 29/08* (2006.01)

(52) U.S. Cl.
CPC ............ *H04L 67/148* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 9,088,564 B1* | 7/2015 | Hobson | H04L 63/0807 |
| 2004/0230825 A1* | 11/2004 | Shepherd | G06F 21/62 726/26 |

* cited by examiner

*Primary Examiner* — Kevin Bates
*Assistant Examiner* — Lesa Kennedy
(74) *Attorney, Agent, or Firm* — Kunzler, PC

(57) ABSTRACT

For securely transferring session information, code creates a session transfer packet in response to receiving a selected option associated with running a server application using a second browser. The session transfer packet has a claim number and a session transfer key. Code activates an authentication application on an electronic device in response to receiving the selected option. In addition, code communicates a claim packet to the electronic device in response to the selected option. The claim packet has the claim number and a server address. The code also receives the claim number from the authentication application. The code further communicates the session transfer packet to the authentication application in response to receiving the claim number. In addition the code communicates a cookie header to the second browser in response to receiving the session transfer key from the second browser.

14 Claims, 7 Drawing Sheets

SECURELY TRANSFERRING SESSION INFORMATION

FIELD

The subject matter disclosed herein relates to session information and more particularly relates to securely transferring session information.

BACKGROUND

Description of the Related Art

Authentications are often required for a browser to access a server application such as a web site.

BRIEF SUMMARY

An apparatus for securely transferring session information is disclosed. The apparatus includes a server that includes a processor and a memory. The memory stores code executable by the processor. The code includes code that creates a session transfer packet in response to receiving a selected option associated with running a server application using a second browser. The session transfer packet has a claim number and a session transfer key. The code further includes code that activates an authentication application on an electronic device in response to receiving the selected option. In addition the code includes code that communicates a claim packet to the electronic device in response to the selected option. The claim packet has the claim number and a server address. The code also includes code that receives the claim number from the authentication application. The code further includes code that communicates the session transfer packet to the authentication application in response to receiving the claim number. In addition the code includes code that communicates a cookie header to the second browser in response to receiving the session transfer key from the second browser. The cookie header includes session information. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
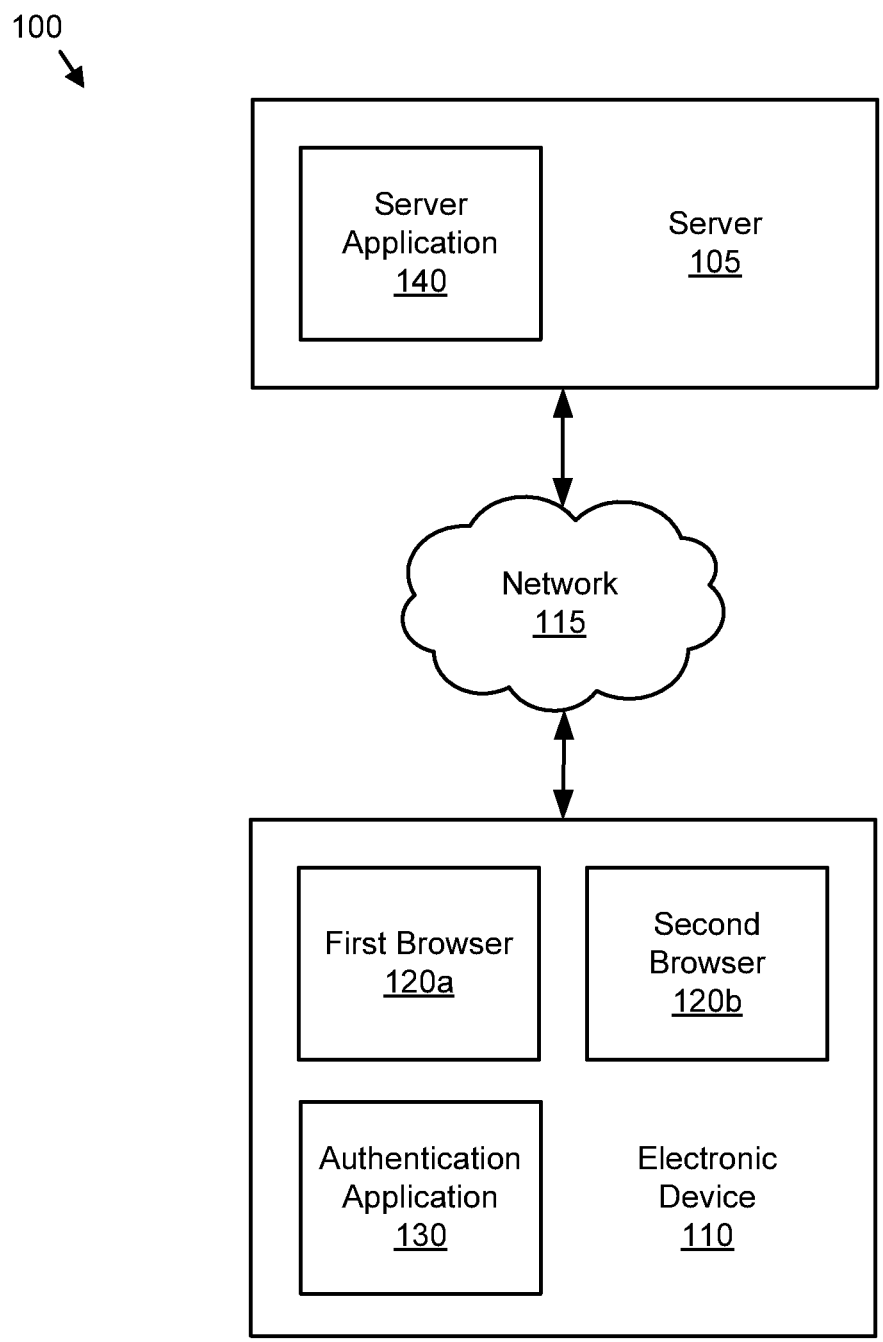
FIG. 1 is a schematic block diagram illustrating one embodiment of an application provision system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of an application provision system 100. The system 100 provides access to a server application 140 from the server 105 to browsers 120 of an electronic device 110. The server application 140 may be a website, a client/server application, or the like.

The server 105 and electronic device 110 may communicate through a network 115. The network 115 may be the Internet, a local area network, a wide-area network, a Wi-Fi network, a mobile telephone network, or combinations thereof.

The electronic device 110 may be a computer workstation, a laptop computer, a tablet computer, a mobile telephone, or the like. The electronic device 110 may include two or more browsers 120. In addition, the electronic device 110 may include an authentication application 130. The authentication application 130 may be downloaded from the server 105 or pre-installed as will be described hereafter.

In one embodiment, a browser 120 is authenticated to the server application 140 in order to access the server application 140. Authentication information such as session information may be stored in a cookie. The session information may be used for subsequent accesses of the server application 140 by the browser 120.

Unfortunately, the cookie and the session information the cookie contains cannot be shared between different web browsers 120. As a result, if the first browser 120a is authenticated to the server application 140, the authentication cannot be passed to the second browser 120b. This may be especially problematic if the second browser 120b is required to access the server application 140. For example, the server application 140 may only be accessible with a MICROSOFT® INTERNET EXPLORER® second browser 120b. However, the initial authentication from the electronic device 110 may be generated from a GOOGLE® CHROME® first web browser 120a.

The embodiments described herein detect an access request from the first browser 120a and communicate a cookie header to the second browser 120b. The cookie header includes session information for the server application 140. The second browser 120b is then able to access the server application 140 without a manual authentication of the second browser 120b. As a result, the authentication of the second browser 120b is both more convenient and more secure.

Figure 2A:
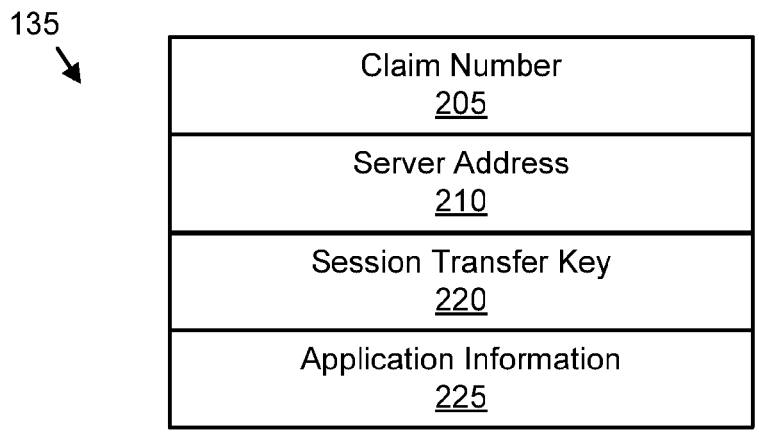
FIG. 2A is a schematic block diagram illustrating one embodiment of a session transfer packet.

FIG. 2A is a schematic block diagram illustrating one embodiment of a session transfer packet 135. The session transfer packet 135 maybe organized as a data structure that is communicated between the server 105 and electronic device 110. In addition, the session transfer packet 135 may be stored in a memory. In the depicted embodiment, the session transfer packet 135 includes a claim number 205, a server address 210, a session transfer key 220, and application information 225.

The claim number 205 is a unique identifier that is used to securely exchange information between the server 105 and the electronic device 110. The server address 210 is an address of the server 105. The server address 210 may be an IP address, a logical address, a domain name based address, or combinations thereof.

The session transfer key 220 may be an identifier that authenticates the authentication application 130 and/or second browser 120b to the server application 140. The session transfer key 220 may be binary values, alphanumeric values, or combinations thereof.

The application information 225 may specify parameters and protocols for accessing the server application 140. In one embodiment, the application information 225 specifies the browsers 120 that may be used to access the server application 140.

Figure 2B:
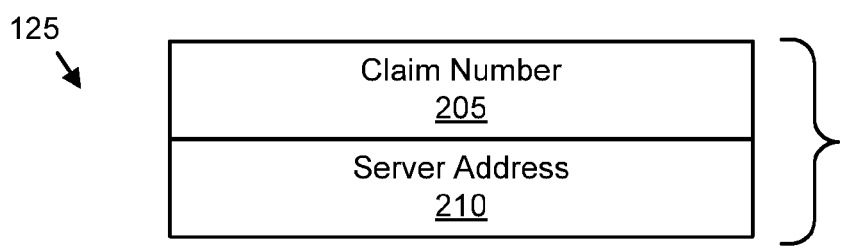
FIG. 2B is a schematic block diagram illustrating one embodiment of a claim packet.

FIG. 2B is a schematic block diagram illustrating one embodiment of a claim packet 125. The claim packet 125 maybe organized as a data structure that is communicated from the server 105 to the electronic device 110. In addition, the claim packet 125 may be stored in a memory. In the depicted embodiment, the claim packet 125 includes the claim number 205 and the server address 210. In one embodiment, the claim number 205 and the server address 210 are encrypted 215.

Figure 2C:
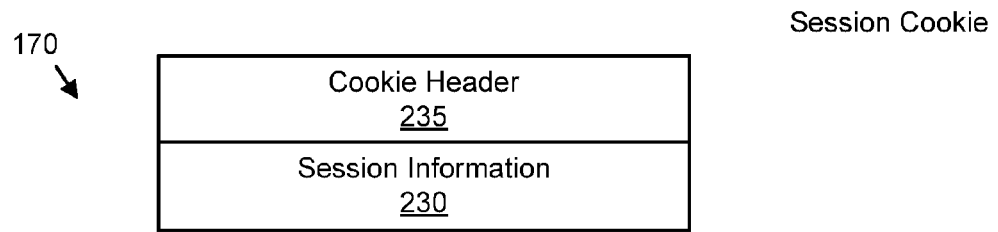
FIG. 2C is a schematic block diagram illustrating one embodiment of a session cookie.

FIG. 2C is a schematic block diagram illustrating one embodiment of a session cookie 170. The session cookie 170 may be organized as a data structure in a memory. In the depicted embodiment, the session cookie 170 includes a cookie header 235 and session information 230.

The cookie header 235 may allow a browser 120 to access the session cookie 170. The session information may be appended to the cookie header 235. The session information 230 may include parameters and protocols for communicating with the server application 140.

Figure 3A:
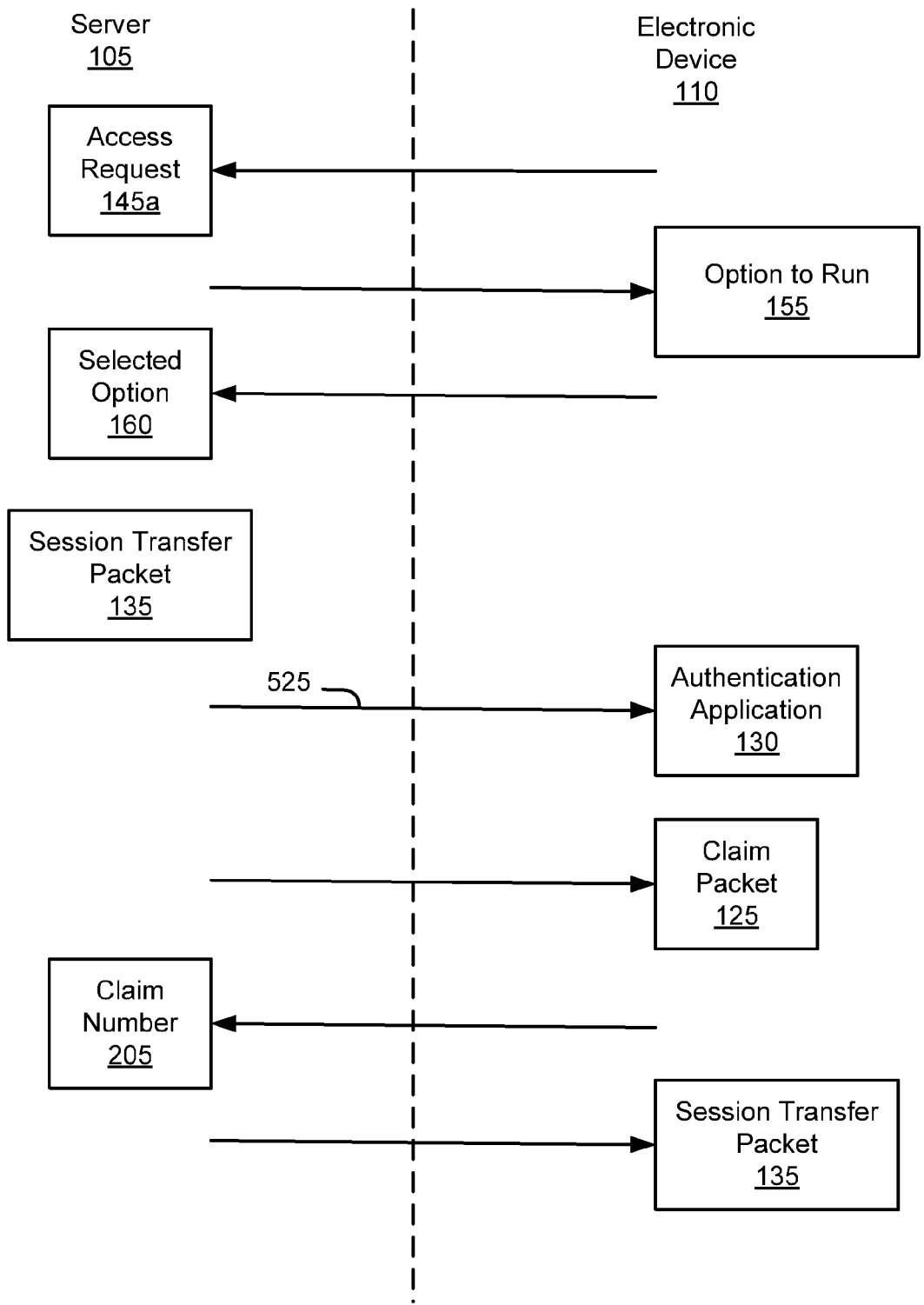
FIGS. 3A-B are schematic block diagrams illustrating one embodiment of data creation and flow.
Figure 3B:
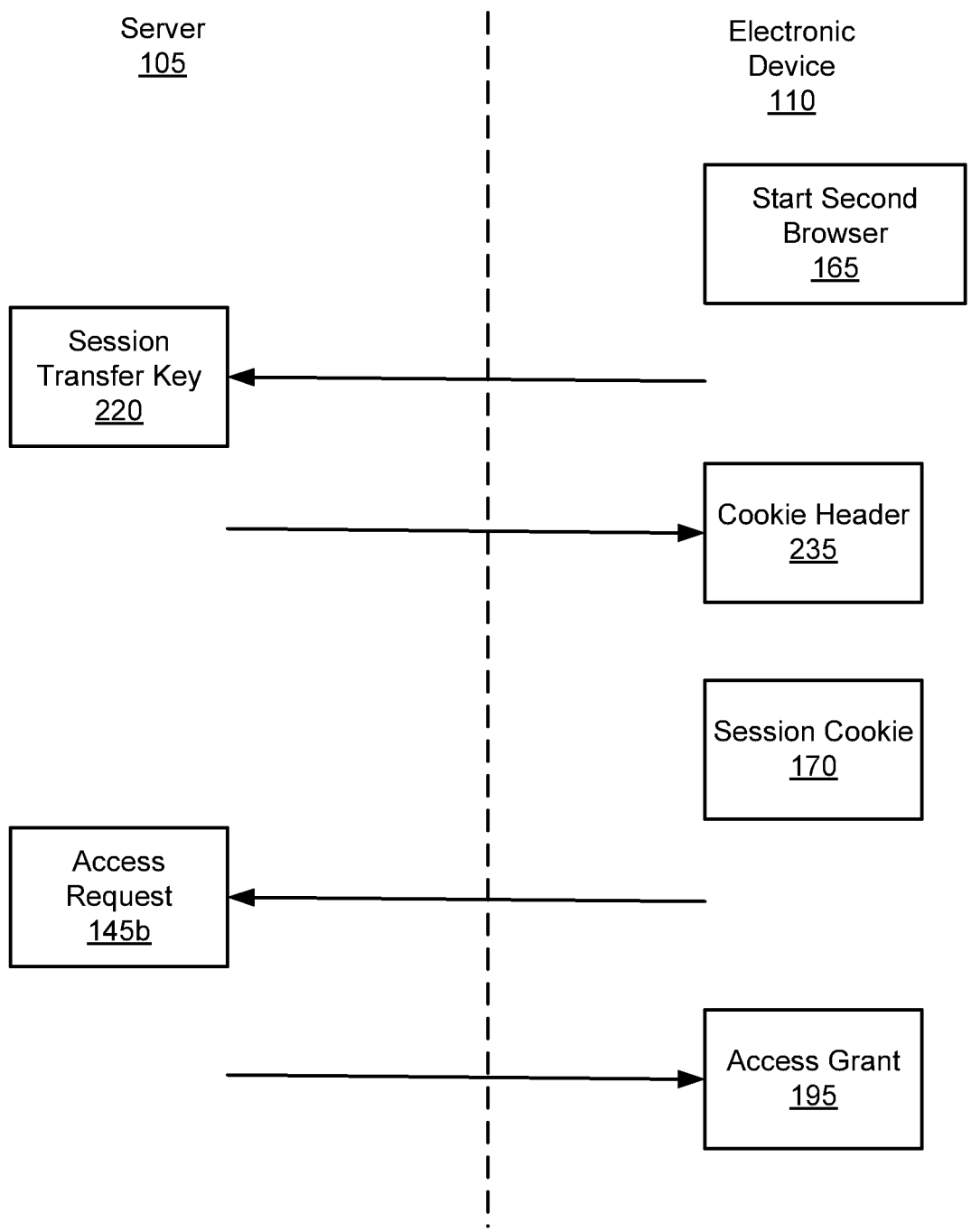

FIGS. 3A-B are schematic block diagrams illustrating one embodiment of data creation and data flow between the server 105 and electronic device 110. In the depicted embodiment, the first browser 120a of the electronic device 110 communicates an access request 145a to the server 105. The server 105 may communicate an option to run 155 to the first browser 120a on the electronic device 110. The option to run 155 is associated with running the server application 140 using the second browser 120b.

The electronic device may communicate a selected option 160. The selected option 160 assents to running the server application 140 using the second browser 120b. The server 105 generates the session transfer packet 135 in response to the selected option 160. In addition, the server 105 activates 525 the authentication application 130 on the electronic device 110 as will be described hereafter and communicates the claim packet 125 to the electronic device 110.

The authentication application 130 may extract the claim number 205 from the claim packet 125 and communicates the claim number 205 to the server 105. The server 105 may access the session transfer packet 135 using the claim number 205 as an index and may communicate the session transfer packet 135 to the authentication application 130 on the electronic device 110.

The authentication application 130 may start 165 the second browser 120b. The authentication application 130 may further extract the session transfer key 220 from the session transfer packet 135 and communicate the session transfer key 220 to the server 105.

In response to receiving the session transfer key 220, the server 105 may communicate the cookie header 235 to the second browser 120b. Alternatively, the server 105 may communicate the cookie header 235 to the authentication application 130. In one embodiment, the cookie header 235 includes the session information 230. The second browser 120b may generate the session cookie 170 using the cookie header 235. The second browser 120b may further append the session information 230 created by the first browser 120a to create the session cookie 170.

Alternatively, the authentication application 130 may generate the session cookie 170 using the cookie header 235. In one embodiment, the authentication application 130 appends the session information 230 created by the first browser 120a to create the session cookie 170. Alternatively, the session cookie 170 may be created from the cookie header 235 and the session information 230 received from the server 105.

The second browser 120b may communicate an access request 145b to the server 105. The access request 145b includes the session information 230. The server 105 communicates an access grant 195 to the second browser 120b in response to the session information 230 of the access request 145b. The second browser 120b is an able to access the server application 140.

Figure 4:
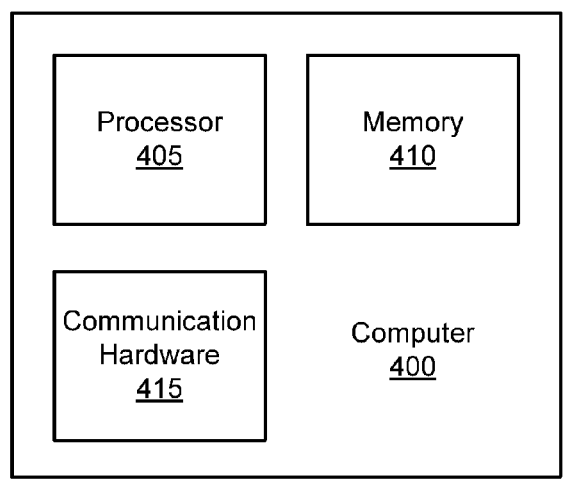
FIG. 4 is a schematic block diagram illustrating one embodiment of a computer.

FIG. 4 is a schematic block diagram illustrating one embodiment of a computer 400. The computer 400 may be embodied in the server 105. In addition, the computer 400 may be embodied in the electronic device 110. In the depicted embodiment, the computer 400 includes a processor 405, a memory 410, and communication hardware 415. The memory 410 may be a semiconductor storage device, a hard disk drive, an optical storage device, a micromechanical storage device, or combinations thereof. The memory 410 may store code. The processor 405 may execute the code. The communication hardware 415 may communicate with other devices. For example, the communication hardware 415 may communicate with the network 115.

Figure 5:
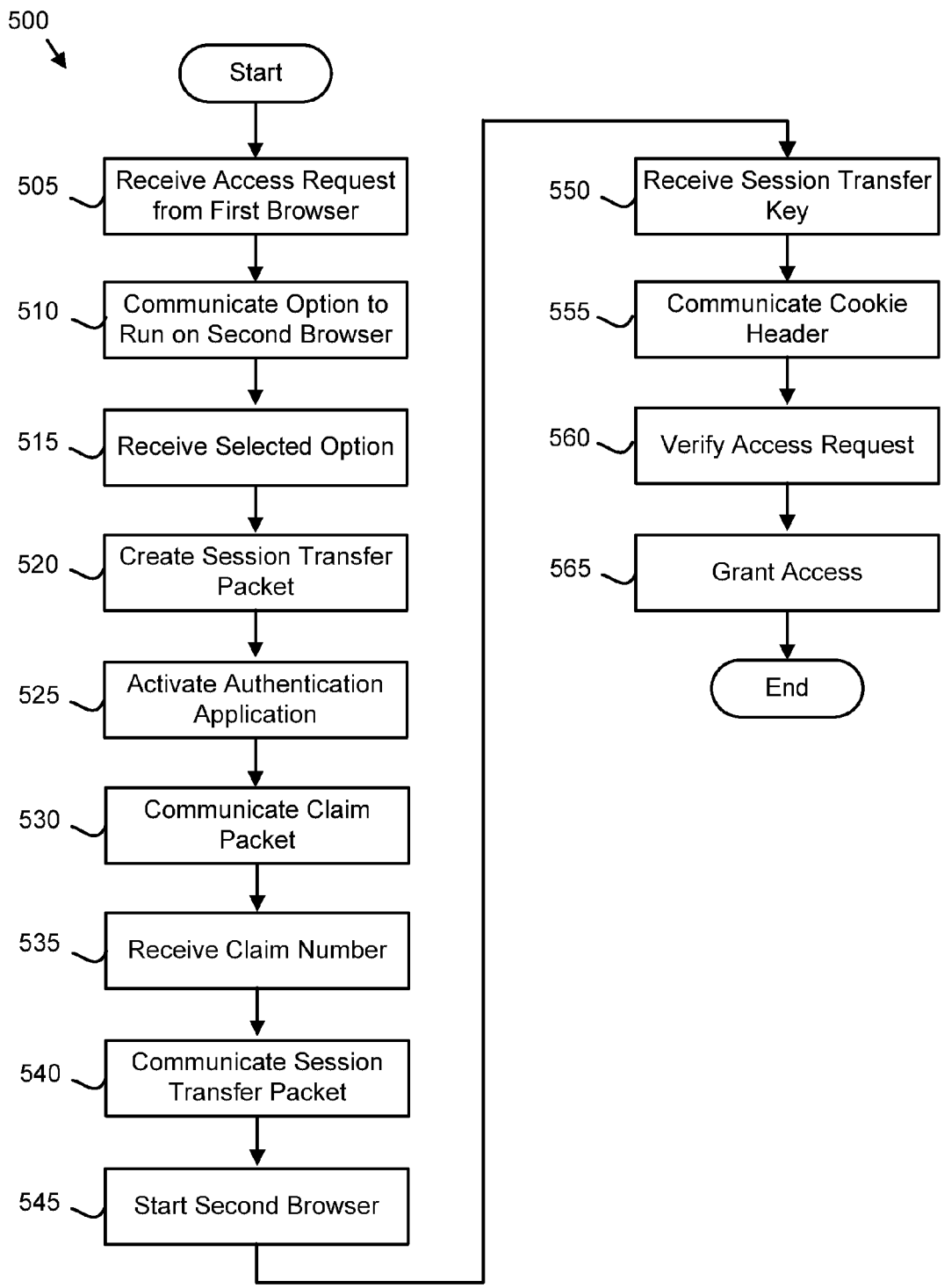
FIG. 5 is a schematic flow chart diagram illustrating one embodiment of a secure session information transfer method.

FIG. 5 is a schematic flow chart diagram illustrating one embodiment of a secure session information transfer method 500. The method 500 securely communicates the session information 230 to the second browser 120b to allow the second browser 120b to access the server application 140. The method 500 may be performed by a processor 405. Alternatively, the method 500 may be performed by computer readable storage medium such as the memory 410. The computer readable storage medium may store code that is executed by the processor 405 to perform the functions of the method 500.

The method 500 starts, and in one embodiment, the server receives 505 the access request 145a from the first browser 120a on the electronic device 110. The access request 145a may request access to the server application 140. In one embodiment, the server application 140 may not be accessed with the first browser 120a. In a certain embodiment, the server application 140 is only accessible using the second browser 120b.

The server 105 may communicate 510 the option to run 155 to the first browser 120a on the electronic device 110. The option to run 155 may allow a user to select to access the server application 140 using the second browser 120b. In one embodiment, the server application 140 is only accessible from the second browser 120b. Thus the electronic device 110 may be unable to access the server application 140 using the first browser 120a. The user may select the selected option 160 and the first browser 120a may communicate the selected option 160 to the server 105.

The server 105 may receive 515 the selected option 160. In addition, the server 105 may create 520 the session transfer packet 135 in response to receiving 515 the selected option 160. In one embodiment, the server 105 creates 520 the session transfer packet 135 by generating the claim number 205. The claim number 205 may be a random number. Alternatively, the claim number 205 may be a next number in a sequence of numbers.

In addition, the server 105 may generate the session transfer key 220 the session transfer key 220 may be a random number. In one embodiment, the session transfer key 220 encodes information about the server application 140, the electronic device 110, the first browser 120a, or combinations thereof. The server 105 may further append the server address 210 and the application information 225 to the session transfer packet 135. The server 105 may store the session transfer packet 135 indexed by the claim number 205.

The server 105 may activate 525 the authentication application 130 on the electronic device 110 in response to receiving the selected option 160. In one embodiment, the server 105 activates 525 the authentication application 130 by downloading the authentication application 130 to the electronic device 110. The server 105 may download the authentication application 130 through the first browser 120a. In addition, the server 105 may direct the first browser 120a and/or the electronic device 110 to install and execute the authentication application 130 on the electronic device 110.

In an alternative embodiment, the authentication application 130 was previously installed on the electronic device 110. The server 105 may activate 525 the authentication application 130 by initiating the execution of the authentication application 130 on the electronic device 110.

In one embodiment, the server 105 communicates 530 the claim packet 125 to the authentication application 130. The authentication application 130 may extract the claim number 205 and the server address 210 from the claim packet 125. In one embodiment, the authentication application 130 decrypts the claim number 205 and the server address 210. The authentication application 130 may further communicate the claim number 205 to the server 105.

The server 105 receives 535 the claim number 205. The server 105 may retrieve the session transfer packet 135 using the claim number 205 as an index. The server 105 may further communicate 540 the session transfer packet 135 to the authentication application 130 in response to receiving 535 the claim number 205. The authentication application 130 may extract the session transfer key 220 from the session transfer packet 135.

In one embodiment, the authentication application 130 starts 545 the second browser 120b. The authentication application 130 may start 545 the second browser 120b in response to receiving the session transfer key 220 and/or the session transfer packet 135. The authentication application 130 may further provide the second browser 120b with the session transfer key 220. The authentication application 130 may communicate the session transfer key 220 to the server 105. Alternatively, the second browser 120b may communicate the session transfer key 220 to the server 105.

The server 105 may receive 550 the session transfer key 220. The server 105 may further communicate 555 the cookie header 235 and/or the session cookie 170 to the second browser 120b in response to receiving the session transfer key 220 from the second browser 120b.

In one embodiment, the second browser 120b generates the session cookie 170 by adding the session information 230 originally generated by the first browser 120a to the cookie header 235. Alternatively, the second browser 120b adds the received session information 230 to the received cookie header cookie header 235 to generate the session cookie 170 for the second browser 120b. In a certain embodiment, the second browser 120 adds the session information 230 to a new session cookie 170 for the second browser 120b.

The second browser 120b may generate an access request 145 using the session information 230 and communicate the access request 145 to the server 105. The server 105 may verify 560 the access request 145b. In one embodiment, the server 105 verifies 560 the access request 145b by verifying the session information 230 in the access request 145b. The server 105 may grant 565 access to the server application 140 in response to receiving the session information 230 from the second browser 120b and the method 500 ends.

In one embodiment, the server 105 grants 565 access to the server application 140 by redirecting the second browser 120b to the server application 140. In addition, the server 105 may authenticate the session information 230 from the second browser 120b. As a result, the electronic device 110 may access the server application 140 using the second browser 120b.

The embodiments support the web browsers sharing the session information 230 so that the second browser 120b may access the server application 140. The session information 230 may be withheld from the electronic device 110 to increase security for the session information 230. In addition, the embodiments eliminate a manual authentication of the second browser 120b, simplifying the authentication.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a server comprising:
a processor;
a memory that stores code executable by the processor to:
communicate an option to run on a second browser to a first browser in response to an access request for a server application from the first browser, wherein the server application is only accessible from the second browser and the option to run is associated with the server application;
create a session transfer packet in response to receiving a selected option associated with running the server application using the second browser, the session transfer packet comprising a claim number and a session transfer key, wherein the selected option assents to running the server application using the second browser;
activate an authentication application on an electronic device in response to receiving the selected option;
communicate a claim packet to the electronic device in response to the selected option, the claim packet comprising the claim number and a server address;
receive the claim number from the authentication application;
communicate the session transfer packet to the authentication application in response to receiving the claim number;
communicate a cookie header for a session cookie to the second browser in response to receiving the session transfer key from the second browser, the cookie header comprising session information; and
grant access to the server application in response to receiving the session information of the session cookie accessed using the cookie header by the second browser.

2. The apparatus of claim 1, wherein the code is further executable by the processor to add the session information to the session cookie for the second browser.

3. The apparatus of claim 1, wherein granting access to the server application comprises:
redirecting the second browser to the server application; and
authenticating the session information from the second browser.

4. The apparatus of claim 1, wherein activating the authentication application comprises downloading the authentication application to the electronic device.

5. The apparatus of claim 1, wherein activating the authentication application comprises initiating execution of the authentication application on the electronic device.

6. A method comprising:
communicating, by use of a processor, an option to run on a second browser to a first browser in response to an access request for a server application from the first browser, wherein the server application is only accessible from the second browser and the option to run is associated with the server application;
creating a session transfer packet in response to receiving a selected option associated with running the server application using the second browser, the session transfer packet comprising a claim number and a session transfer key, wherein the selected option assents to running the server application using the second browser;
activating an authentication application on an electronic device in response to receiving the selected option;
communicating a claim packet to the electronic device in response to the selected option, the claim packet comprising the claim number and a server address;
receiving the claim number from the authentication application;
communicating the session transfer packet to the authentication application in response to receiving the claim number;
communicating a cookie header for a session cookie to the second browser in response to receiving the session transfer key from the second browser, the cookie header comprising session information; and
granting access to the server application in response to receiving the session information of the session cookie accessed using the cookie header by the second browser.

7. The method of claim 6, the method further comprising adding the session information to the session cookie for the second browser.

8. The method of claim 6, wherein granting access to the server application comprises:
redirecting the second browser to the server application; and
authenticating the session information from the second browser.

9. The method of claim 6, wherein activating the authentication application comprises downloading the authentication application to the electronic device.

10. The method of claim 6, wherein activating the authentication application comprises initiating execution of the authentication application on the electronic device.

11. A program product comprising a non-transitory computer readable storage medium that stores code executable by a processor, the executable code comprising code to:
communicate an option to run on a second browser to a first browser in response to an access request for a server application from the first browser, wherein the server application is only accessible from the second browser and the option to run is associated with the server application;
create a session transfer packet in response to receiving a selected option associated with running the server application using the second browser, the session transfer packet comprising a claim number and a session transfer key, wherein the selected option assents to running the server application using the second browser;
activate an authentication application on an electronic device in response to receiving the selected option;

communicate a claim packet to the electronic device in response to the selected option, the claim packet comprising the claim number and a server address;
receive the claim number from the authentication application;
communicate the session transfer packet to the authentication application in response to receiving the claim number;
communicate a cookie header for a session cookie to the second browser in response to receiving the session transfer key from the second browser, the cookie header comprising session information and
grant access to the server application in response to receiving the session information of the session cookie accessed using the cookie header by the second browser.

12. The program product of claim 11, the code further adding the session information to the session cookie for the second browser.

13. The program product of claim 11, wherein granting access to the server application comprises:
redirecting the second browser to the server application; and
authenticating the session information from the second browser.

14. The program product of claim 11, wherein activating the authentication application comprises downloading the authentication application to the electronic device.

* * * * *